NOISE DISCRIMINATION BY UNBLANKING DURING THE TIME THAT AN A-C REFERENCE SIGNAL IS IN THE NEIGHBORHOOD OF THE VALUE IT HAD AT THE TIME OF THE PREVIOUSLY ACCEPTED PULSE
Filed June 25, 1964

INVENTORS.
SHELDON JONES,
RAYMOND W. BRIGGS,
BY Robert Thompson
ATTORNEY.

NOISE DISCRIMINATION BY UNBLANKING DURING THE TIME THAT AN A-C. REFERENCE SIGNAL IS IN THE NEIGHBORHOOD OF THE VALUE IT HAD AT THE TIME OF THE PREVIOUSLY ACCEPTED PULSE

Filed June 25, 1964

United States Patent Office 3,445,663
Patented May 20, 1969

3,445,663

NOISE DISCRIMINATION BY UNBLANKING DURING THE TIME THAT AN A-C REFERENCE SIGNAL IS IN THE NEIGHBORHOOD OF THE VALUE IT HAD AT THE TIME OF THE PREVIOUSLY ACCEPTED PULSE

Sheldon Jones, Palos Verdes Estates, and Raymond W. Briggs, Manhattan Beach, Calif., assignors to Hughes Aircraft Company, Culver City, Calif., a corporation of Delaware Filed June 25, 1964, Ser. No. 377,864
Int. Cl. G01j *1/20*
U.S. Cl. 250—203 10 Claims

ABSTRACT OF THE DISCLOSURE

This system includes an IR detecting and tracking system and a circuit which dynamically blanks unwanted background noise signals in the tracking field of view by using the error signal information derived from the last unblanked pulse to generate a gating pulse to unblank the input only during the time that a sinusoidal reference signal differs from the value it had at the time of the last unblanked pulse by plus or minus a settable amount.

This invention relates generally to an improved radiation detecting and tracking system which discriminates against unwanted background noise signals in the tracking field of view, and more particularly to a gating device, for use in such a system, which limits the field of view to a selected radiation emitting target and a portion of the background immediately surrounding the target.

Crossed detector arrays of the type described in U.S. Patent No. 3,069,546, of R. W. Buntenbach, issued Dec. 18, 1962, have been used in a nutating scan type of radiation detection and spatial coordinated translation system. Basically, a nutated image of a detected radiation source was reflected onto a crossed array of detector cells to generate electrical pulse information timed or positioned in accordance with the relative radial displacement of the detected radiation and the resultant nutated image from a central axis of rotation. Although this type of system did provide a degree of discrimination in tracking point sources of radiation, the detector also sensed background radiation from the clouds, ground, sun and other objects.

Reduction of field of view would tend to reduce the amount of background noise picked up by the detector; but because this approach reduced the viewing area, the tracking capabilities of the system were also reduced. Consequently, a source of radiant energy which was displaced much from the central axis could not be detected and tracked.

Accordingly, it is an object of this invention to provide a gating circuit which dynamically blanks out the unwanted background area in a field of view without reducing the effective size of the field of view.

Another object of this invention is to provide an improved electrically gated tracking system which blanks out the scanned background except that portion of the background in the vicinity of a selected source of radiant energy.

Another object is to provide an improved tracking system which blanks out the scanned background except an area surrounding the target which is as large as the greatest expected movement of the source of radiation across the scanned field of view.

Still another object of this invention is to provide a variable gating circuit for use in a nutating image type of radiation tracking system in which the tracking system has a tendency or preference for an initially detected source of radiation so that other sources of radiation located in the scanned field of view will not be detected to break the initial acquisition.

Yet another object is to provide a radiation detecting and tracking system in which sources of radiation moving across the scanned field of view at a greater than predetermined rate are not tracked by the system.

Another object is to provide a gate of the above type in which the gating time is short when the expected movement of the source of radiation across the field of view is small and longer when the expected movement is greater.

The above and other objects of this invention can be accomplished by means of a radiation detection and tracking system in which detected radiation is nutated about a cone of revolution by an optical system so that the image of the detected radiation is focused upon and nutated about a crossed array of radiation detector cells in such a manner that an azimuth or elevation pulse is generated each time an individual cell is scanned. This pulse information is fed through individual azimuth and elevation channels each including a gated amplifier circuit. The amplified output pulses of each channel are time compared with an AC reference signal which is in exact synchronism with the nutation cycle so as to generate a DC error voltage. The instantaneous value of this DC error voltage is proportional to the amount that the source of radiation is off center and as a result provides usable spatial coordinate information on the target. This DC error voltage is also fed back to a gating pulse generator which compares the DC error signal with the AC reference signal to generate gating control pulses having a predetermined time width on each side of a pulse center as determined by the last received pulse. This gating control pulse is then applied to a pulse gate in the amplifier circuit so as to only open the gate for a short time interval on each side of the next expected pulse as determined by the past history of the pulses; as a result, only those pulses within the immediate vicinity of the last received pulse are allowed to pass while all other signals are blocked.

Other objects, features and advantages of this invention will become apparent upon reading the following detailed description of one embodiment of the invention and referring to the accompanying drawings in which:

FIG. 1 is a block diagram of a nutating optical system showing the tilted relationship of the optical axis to the central axis of rotation;

FIGS. 2*a* and 2*b* are diagrammatic illustrations of an exaggerated geometric relationship of a nutated cone of revolution generated by an optical system showing the circular scan of a projected image focused upon the crossed detector array for on-center and off-center target conditions, respectively;

Figure 4:
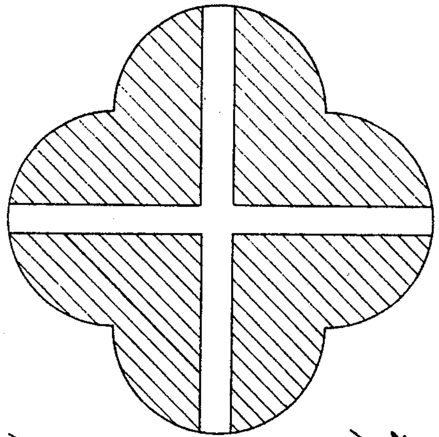
FIG. 4 is a diagrammatic illustration of the geometric relationships of the ungated field of view of the nutating optical system and the gated field of view of the same nutating optical system in which the gated out or blanked out portion of the field of view is shown in a line shaded representation.
Figure 8:
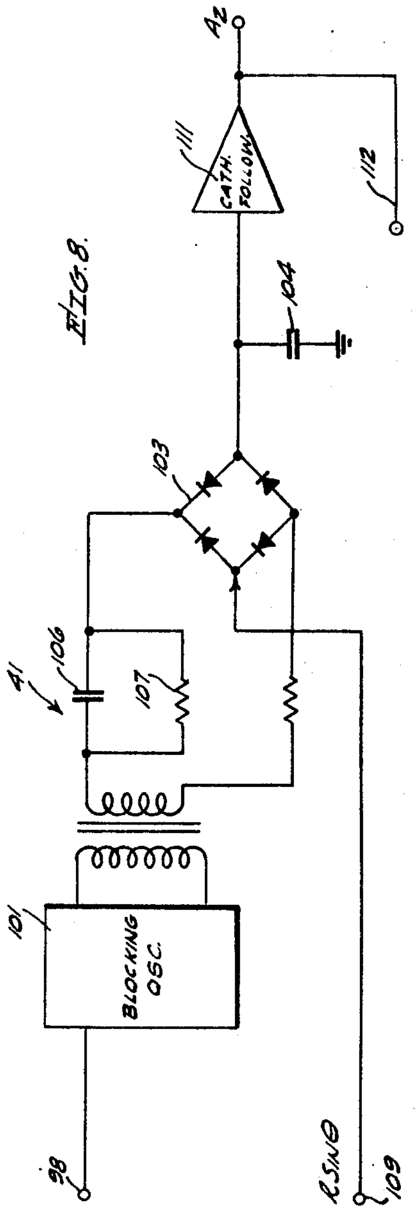
FIG. 8 is a schematic circuit diagram of one of the sample hole circuits illustrated diagrammatically in FIG. 4.
Figure 11A:
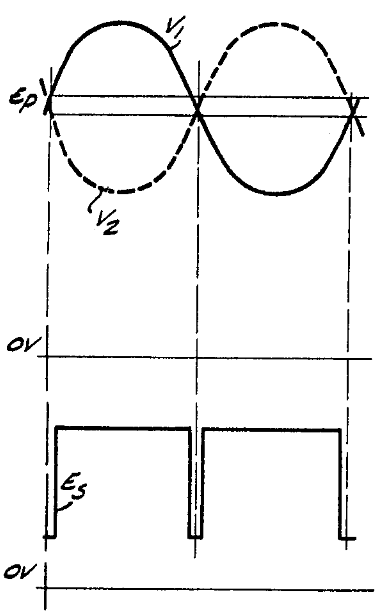
Figure 11B:
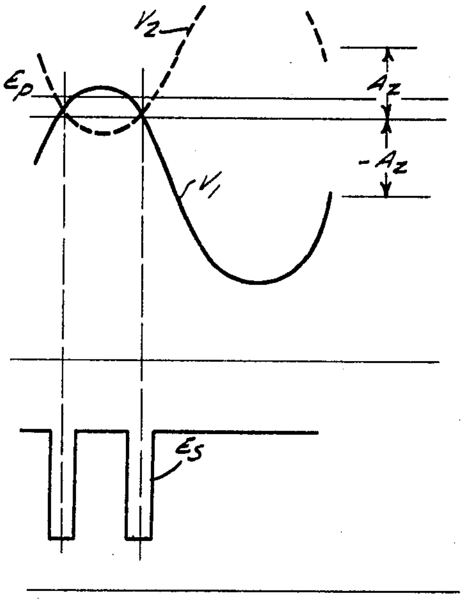
Figure 12:
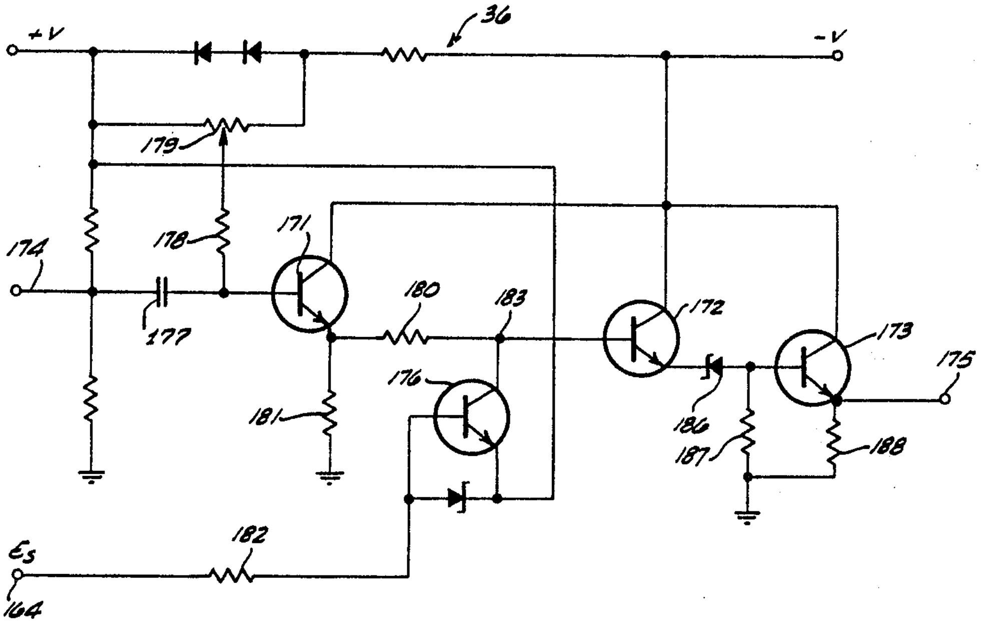

FIGS. 11*a* and 11*b* shows two graphs illustrating the voltage waveforms generated within the gating pulse generator of FIG. 8 and the output gating pulse signal which is applied to the pulse gate for an on-center and an off-center tracking condition respectively; and FIG. 12 is a schematic circuit diagram of one of the pulse gates illustrated diagrammatically in FIG. 4.

Figure 2A:
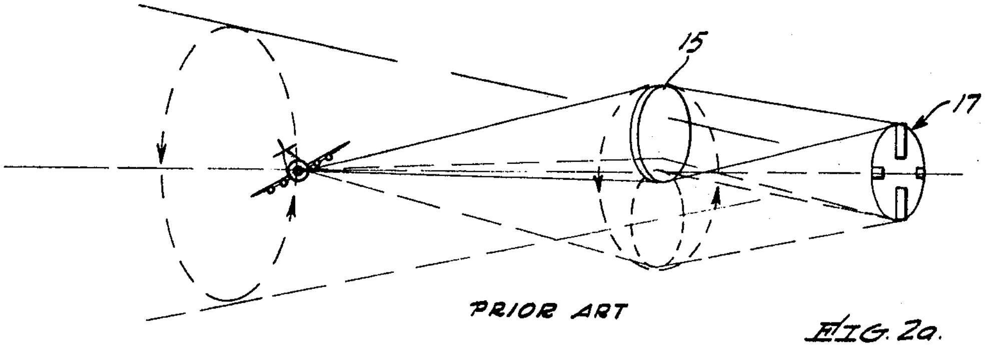
Figure 2B:
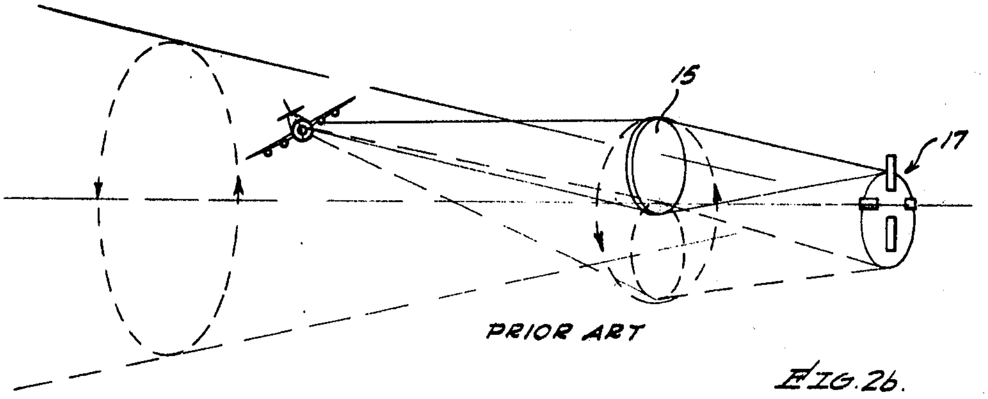
Figure 1:
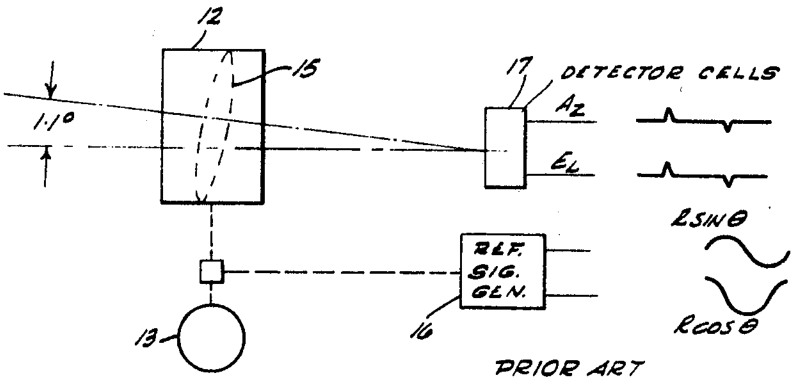

As illustrated in FIG. 1, a nutating optical system can include a rotatable sleeve 12 connected to be driven by a motor 13. A lens 15 is mounted within the sleeve so that the optical axis is tilted at an angle (1.1°, for instance) to the central or mechanical axis of lens rotation. As also illustrated in FIGS. 2*a* and 2*b*, any detected radiation is nutated in a cone of revolution to project an image of the detected radiation about a circular path scanning a crossed array of radiation detector cells 17. The motor 13 is also connected to drive a reference signal generator 16 to generate a sinusoidal signal and a cosinusoidal signal which are in exact synchronism with the nutation cycle. Although the optical system is schematically illustrated as a refractive optical system, it is fully possible to use reflective optical systems such as those described in the previously referred to U.S. Patent No. 3,069,546 and U.S. Patent No. 3,117,231 to H. E. Haynes, issued Jan. 7, 1964.

Figure 3:
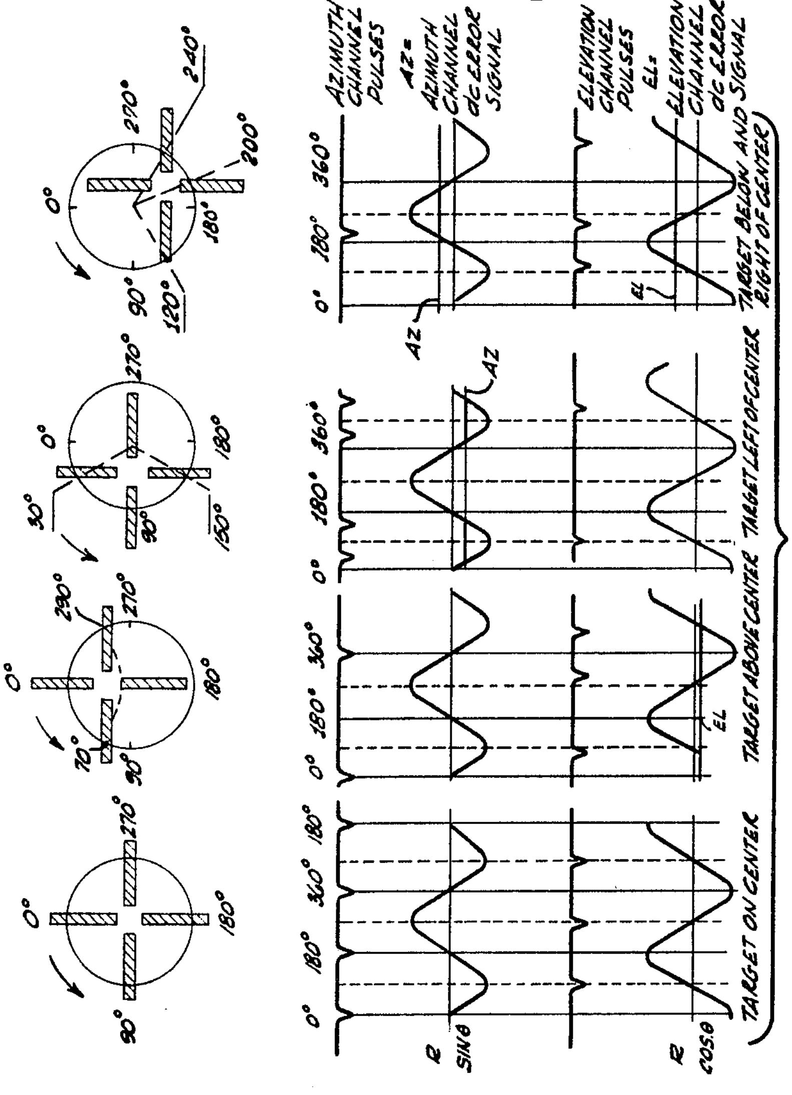
FIG. 3 is a schematic and graphical illustration of the relationship between the pulses generated by the detector cells with relation to the AC reference signal waveforms for four different target conditions.

Referring back to the exaggerated geometric and perspective illustrations of FIG. 2, as the image scans each individual detector cell a pulse is generated from which usable target position information can be obtained. In target tracking operations where the source of radiation is on a central axis (FIG. 2*a*), that is, the axis of lens rotation, the cells are scanned at equally spaced 90° intervals, thereby generating four equally spaced pulses as graphically illustrated in the pulse waveforms of the first example of FIG. 3. When, however, the target is above the center axis (FIG. 2*b*), the image is projected in a manner illustrated schematically in the second example of FIG. 3 and, as a result, the pulses generated are not equally spaced and one pulse is missing as illustrated by the pulse waveforms of the second example of FIG. 3. By comparing these unequally spaced or time modulated pulses with an azimuth sinusoidal AC reference signal and an elevation cosinusoidal AC reference signal, DC error voltage $A_z$ and $E_1$ can be obtained, respectively, which DC signals are used to control a gating circuit in a manner to be explained shortly. The other two examples graphically illustrated in FIG. 3 are for different target conditions wherein different DC error voltages are generated as illustrated.

By proper use of these DC error voltages it is possible to gate the tracking system so that the dynamic field of view is reduced to a cross (in space) which is dynamically positioned within the four-lobe ungated scan pattern by the past history of the detected pulses. This geometric relationship of the ungated tracking area to the gated tracking area is illustrated graphically in FIG. 4 with the peripheral dimensions of the line shaded four-lobe unblanked field of view being defined by the extreme fringe position of a detected radiation source for which the corresponding nutated image will just scan one of the detector cells. For purposes of illustration, the blanked out portion of the field of view is shown in a shaded line representation with a centered gated field of view cross being enclosed within an area bounded by the dashed lines. The width of each arm of the unblanked cross is equal to a chord of an arc generated by the path of the nutation scan during a gating interval.

Figure 5:
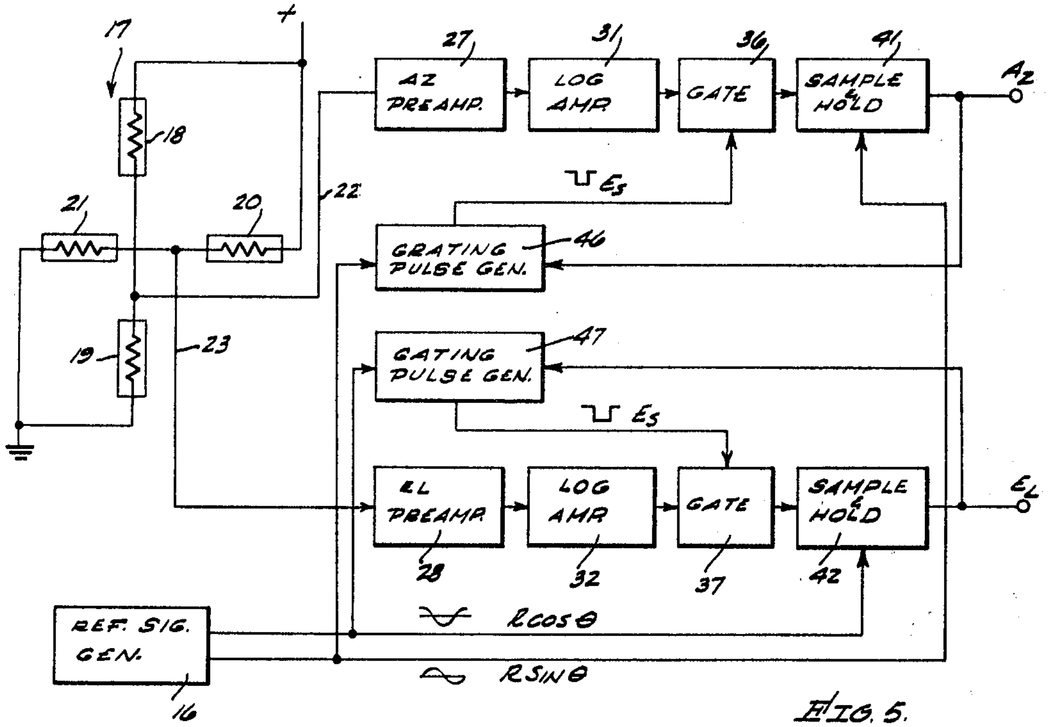
FIG. 5 is a block diagram of the radiation detecting and tracking system of this invention.

Now referring to the tracking system in more detail, FIG. 5 illustrates a schematic block diagram of a crossed array tracking system which operates on the above discussed nutating image principle. As the nutating image is focused upon and scanned about the crossed array of detector cells 17 a plurality of individual lead selenide detector cells 18, 19, 20 and 21 vary in resistance as the image radiation strikes them to unbalance the resistances of the connected cell pairs 18–19 and 20–21. As a result the quiescent potential level at the center taps 22 and 23 varies relative to ground potential to generate what will hereafter be referred to as positive and negative polarity pulses. Considering the connected cell pairs 18–19 to be an azimuth detection arm having a center tap output 22 and the connected cell pair 20–21 to be an elevation detection arm having a center tap output terminal 23, one end of each arm is connected to a reference terminal of a potential source (not shown), while the opposite end of each arm is connected to a positive terminal of the potential source (not shown). Thus, as radiation strikes any one of the cells the resistance of that particular cell decreases to unbalance that arm and vary the potential at the related center tap output 22 or 23.

For example, radiation striking the upper azimuth cell 18 decreases the resistance of that cell to unbalance the azimuth arm and generate a positive polarity pulse signal on the azimuth output terminal 22; conversely, radiation striking lower azimuth cell 19 will also unbalance the azimuth arm to generate a relatively negative polarity pulse signal on the azimuth output terminal 22. Similarly, radiation striking the right-hand elevation cell 20 will decrease its resistance to unbalance the elevation arm and generate a positive pulse on the elevation output terminal 23; conversely, radiation striking the left-hand elevation cell 21 will also unbalance the elevation arm and generate a negative polarity pulse on elevation output terminal 23. Thus, positive pulses are generated during one half of the nutation cycle and negative pulses during the remaining half of the cycle.

The pulse signals generated in the azimuth and elevation detector arms are applied to an azimuth signal preamplifier 27 and an elevation signal preamplifier 28, respectively, which amplify the pulse signals to a usable level. These preamplifier pulses are thereafter fed from the preamplifiers 27 and 28 to an azimuth logarithmic amplifier 31 and an elevation logarithmic amplifier 32, respectively, which increase the dynamic range of the system. The logarithmic pulse signals are thereafter fed through an azimuth signal pulse gate 36 and an elevation signal pulse gate 37, respectively, and applied to an azimuth and an elevation sampling gate or sample and hold circuits 41 and 42, respectively. A sinusoidal AC reference voltage R sin $\theta$ generated by the reference signal generator 16 is applied to the sample and hold circuit 41 so as to generate a D-C error voltage $A_z$ having an instantaneous value determined by the position of the pulse signal with reference instantaneous value to the sinusoidal reference signal. A cosinusoidal reference signal, R cos $\theta$, also generated by the reference generator circuit 16, is applied to the elevation sample and hold circuit 42 so as to generate an elevation D-C error voltage $E_1$ having an instantaneous value determined by the position of the elevation pulses with relation to instantaneous value of the cosinusoidal A-C reference voltage. An appropriate means for generating two A-C reference voltage waveforms which are in phase with and in time frequency with the nutation cycle is illustrated in the previously referenced U.S. Patent No. 3,117,231. These D-C error voltages are fed back to an azimuth and an elevation gating pulse generator 46 and 47, respectively. The sinusoidal azimuth reference voltage R sin $\theta$ is also applied to the azimuth gating pulse generator 46 while the cosinusoidal elevation reference voltage is applied to the elevation gating pulse generator 47 so that comparison of the A-C reference voltages with the D-C error voltage results in the generation of a gating pulse $E_s$ having a predetermined time width on each side of the center of the corresponding next expected pulse generated at detector cells during the next nutation cycle. As a result, the azimuth gate 36 and the elevation gate 37 are only open for a short time prior to and after the next expected pulse whereby all other pulse signals outside of this gated time period are blocked.

In that the azimuth channel and the elevation channel are substantially identical in structure, the following detailed descriptions of the circuit elements are limited to those elements included in the azimuth channel and it should be understood that the detailed descriptions are also applicable to the corresponding elements in the elevation channel.

Figure 6:
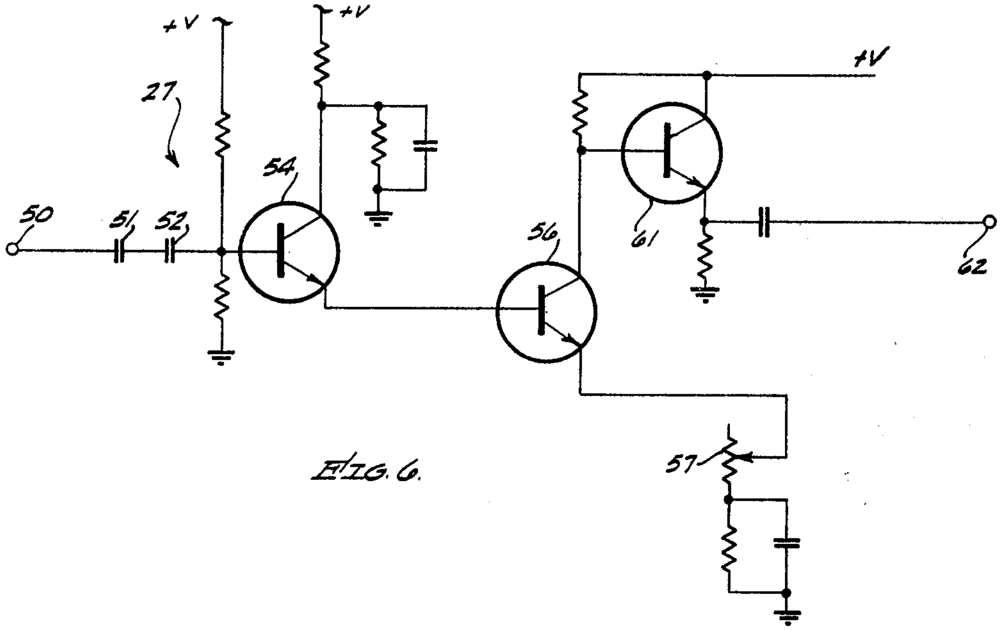
FIG. 6 is a schematic circuit diagram of one of the preamplifiers illustrated diagrammatically in FIG. 4.

Referring to the azimuth preamplifier circuit diagram illustrated in FIG. 6, the low amplitude negative and positive polarity pulses from the azimuth detector arm are applied to the azimuth preamplifier 27 through an input terminal 50, a pair of coupling capacitors 51 and 52, and to the base of an input stage emitter follower transistor 54. The emitter follower transistor 54 is directly coupled to the base of an amplifier stage transistor 56 and provides an impedance match between the detector cells 18–19 and the amplifier stage. An adjustable resistor 57 is connected between the emitter terminal of the amplifier stage transistor 56 and a reference potential terminal of a voltage source (not shown) for producing a negative feedback signal and providing circuit stability and gain adjustment for the amplifier stage. By making the gain of the amplifier transistor 56 adjustable it is also possible to insure balanced preamplifier outputs for each channel. The collector terminal of the amplifier stage transistor 56 is directly coupled to the base terminal of an output stage emitter follower 61 which in turn provides impedance matching between the amplifier stage and the output terminal 62 to the logarithmic amplifier 31. The amplified pulses are thus fed through the output stage emitter follower 61 to the azimuth logarithmic amplifier 31.

Figure 7:
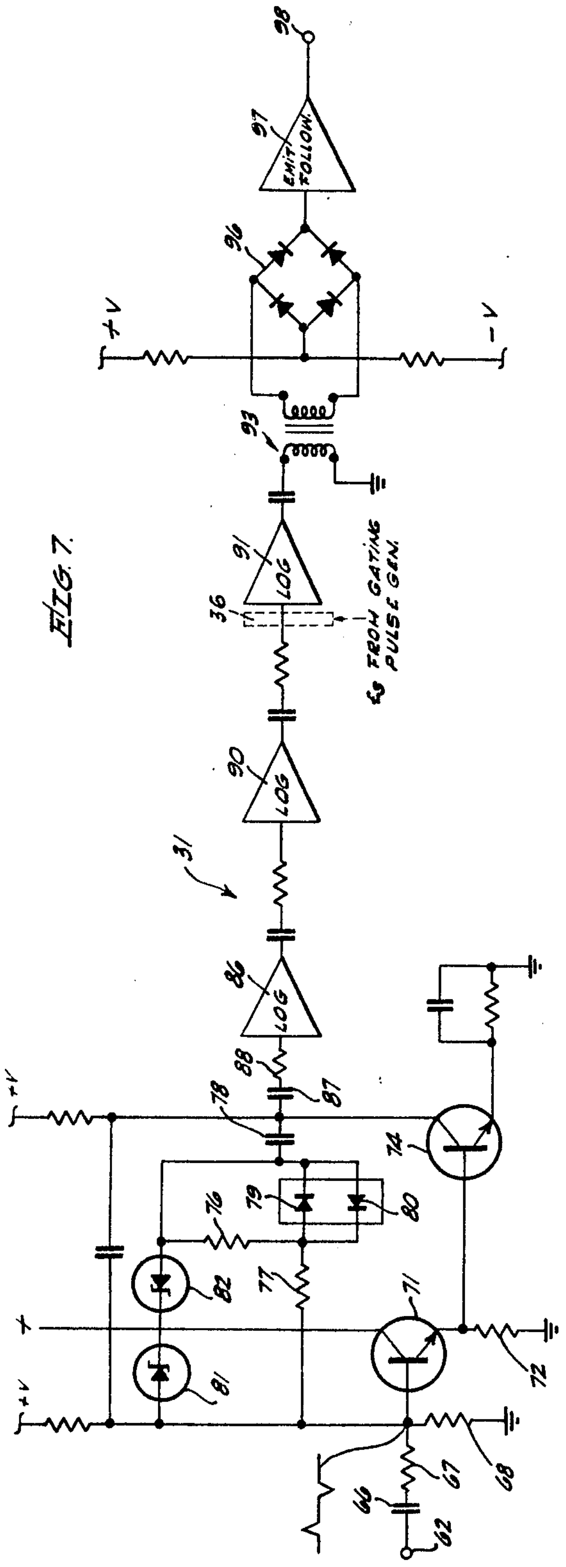
FIG. 7 is a schematic circuit diagram of one of the logarithmic amplifiers illustrated diagrammatically in FIG. 4 without the gate connected in place.

By feeding the amplified positive polarity and negative polarity pulses to a multiple logarithmic amplifier circuit 31, the pulse information is converted to a more usable form and is then full-wave rectified at the output. Referring to FIG. 7, the azimuth logarithmic amplifier circuit 31 is illustrated with the first stage logarithmic amplifier in a schematic diagram form and the following three stages of logarithmic amplifier in block diagram form. It should be noted that the block diagram stages are substantially identical to the circuit of the first stage. The operation pulse signals received from the azimuth preamplifier 27 on terminal 62 are fed through a differentiating circuit including a capacitor 66 and a pair of resistors 67 and 68 to convert the pulse information to positive and negative pulse spike waveforms. This differentiated signal is thereafter applied to the base terminal of an input stage emitter follower transistor 71 whereupon the voltage signal developed across an emitter resistor 72 is applied to the base terminal of a directly coupled common emitter amplifier stage transistor 74. A feedback loop is connected between the collector terminal of the amplifier stage transistor 74 and the base terminal of the input stage emitter follower transistor 71 to control the amplification of the logarithmic amplifier in accordance with the amplitude of the input pulses. More specifically, the feedback loop includes two feedback resistors 76 and 77 which are A-C coupled to the output stage collector by coupling capacitor 78. By shunting one feedback resistor 76 with a parallel pair of oppositely polarized diodes 79 and 80, the initial forward resistance of these diodes is sufficiently high relative to the resistance of resistor 76 that the feedback signal passes through the feedback path formed by resistors 76 and 77 for very low amplitude signals. When, however, the feedback signal exceeds a certain level, one of the appropriate diodes 79 or 80 forward conducts with a logarithmic characteristic to shunt the feedback resistor 76 and to feed the feedback signal through the feedback resistor 77. Thus, the first stage logarithmic amplifier amplifies the input signal linearly for very low signal levels and logarithmically for signals above a predetermined level. In order to handle very large feedback signals the feedback resistors 76 and 77 are in turn shunted with a pair of oppositely polarized Zener diodes 81 and 82 which break down to shunt the resistor when the feedback signal exceeds a predetermined level, thereby obtaining a very small amplifier gain at the higher signal ranges.

Now referring to the block diagram portion of the logarithmic amplifier, the second stage logarithmic amplifier 86 is identical to the previously described first stage and is coupled in series circuit by a coupling capacitor 87 and a resistor 88. The following two logarithmic amplifier stages 90 and 91 are substantially identical to the first two stages with the exception that the Zener diodes are omitted. In one embodiment the azimuth pulse gate 36 can be connected in series circuit as illustrated in dashed line, between the third stage 90 and fourth stage 91, or in another embodiment even after the fourth stage 91 or even after the logarithmic amplifier as illustrated in FIG. 5. In operation, the output from the last stage logarithmic amplifier 91 is A-C coupled to a ringing oscillator 93 which includes a series coupling capacitor and the inductance of a transformer winding tuned to produce several oscillations when pulsed. The oscillating output from the ringing oscillator is full-wave rectified by a diode bridge 96. The full-wave rectified output is thereafter passed through a conventional emitter follower 97 of the type described on page 46 of the Department of the Army Technical Manual TM 11–690, dated March 1959.

When the azimuth pulse gate 36 is unblocked, as shall be explained shortly, the received pulses are transmitted to the sampling gate 41 which converts the pulse position information to an azimuth D-C error signal having an instantaneous value proportional to the amount that the detected radiation is off center or displaced radially from the central axis of lens rotation.

The sampling gate 41 simultaneously applies the pulse signals and the synchronized A-C reference to a pulse signal controlled diode switch so that the instantaneous value of the A-C reference signal $R \sin \theta$, at the time the pulse is received on terminal 98 is conducted and converted to a D-C error signal $A_z$. Now referring to FIG. 8, the sample and hold circuit 41 is illustrated partially in block diagram and partially in schematic diagram. In this sample and hold circuit the logarithmic pulse signals are applied through the input terminal 98 to a blocking oscillator 101, of the type described on page 201 of the previously referred to Department of the Army Technical Manual, which converts the full-wave rectified pulses to a single switching pulse which, in turn, is connected across a diode bridge switch 103 to control the forward bias and conduction of the diodes. Thus, when the switching pulse forward biases the diodes of the switching bridge 103, the sinusoidal azimuth reference signal connected across the other terminals of the switching bridge is conducted to charge a storage capacitor 104 to a D-C error voltage. More specifically, a pulse signal induced at a secondary winding of the blocking oscillator 101 charges a capacitor 106 and forward biases the diodes of the switching bridge 103 to conduction. Thus, at each switching pulse signal the diodes of the switching bridge 103 are forward biased for a short time interval; and between switching pulse signals the charged capacitor 106 discharges through the resistor 107 to reverse bias the diodes of switching bridge 103 into a nonconducting state. When the switching bridge 103 is forward biased to a conducting state by the switching pulse signal, the azimuth reference voltage $R \sin \theta$ applied through an input lead 109 is passed through the conducting diodes to charge the storage capacitor 104, whereupon a voltage signal is developed across the storage capacitor 104 having an instantaneous value dependent upon the instantaneous value of the A-C reference signal at the time of the switching pulse.

This switching relationship for four different pulse conditions is illustrated in FIG. 3. Thus, if the detected radiation is on center, the switching pulse occurs at a time when the sinusoidal azimuth reference signal is at a zero amplitude, no voltage is transferred to the storage capacitor 104 and, as a result, no potential develops across the capacitor. This on-center condition is illustrated in Example 1 of FIG. 3. When the detected radiation is off center, however, the switching pulse occurs at a time when the sinusoidal azimuth reference voltage has an instantaneous value and, as a result, the storage capacitor 104 is charged to develop a D-C voltage across it. This off-center condition is illustrated in Examples 2 through 4 of FIG. 3. The D-C voltage so developed across the storage capacitor 104 is applied through a conventional cathode follower 111 of the type described in Applied Electronics, 2d ed., by T. S. Gray, published by John Wiley & Sons, p. 429, to generate a D-C error signal output.

Figure 9:
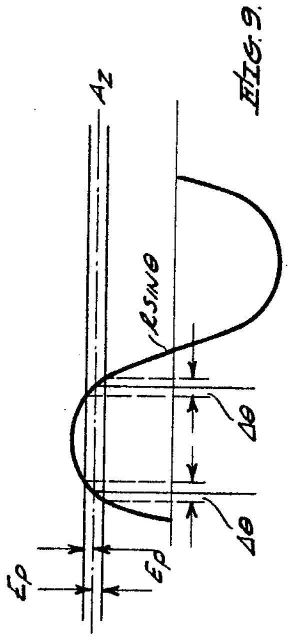
FIG. 9 is a graph illustrating the relationship of an AC reference voltage to the gating times on each side of the DC error voltage and the resultant gating time period.

This D-C error signal $A_z$ is then fed back to the azimuth gating pulse generator 46 over line 112 where it is again compared to the sinusoidal azimuth reference voltage $R \sin \theta$ so as to generate a square wave output pulse which unblocks the azimuth gate 35 for a predetermined time interval on each side of the next expected pulse. This relationship of the azimuth D-C error voltage $A_z$ to the sinusoidal azimuth reference voltage $R \sin \theta$ can best be explained graphically by referring to FIG. 9 in which the D-C error voltage $A_z$ is graphically illustrated as intersecting the sinusoidal azimuth reference volatge waveform $R \sin \theta$ at a voltage level dependent upon the amplitude of the D-C error signal. Thus, by using the azimuth D-C error voltage to determine the past history of the azimuth pulses, it can be assumed that the next corresponding azimuth pulse generated on the subsequent nutation cycle will occur after $360° \pm$ a small amount $\Delta\theta$ because the tracked radiation is capable of moving only a small distance across the field of view during a single nutation cycle. Since some movement of the target across the field of view can normally be expected the azimuth gate 36 is switched on for a predetermined time interval from $360° - \theta/2$ to $360° + \theta/2$ from the last received corresponding azimuth pulse. The operation of this gating sequence is obtained by comparing the sinusoidal azimuth reference voltage $R \sin \theta$ to the D-C error signal which turns the azimuth gate 36 on any time that the instantaneous value of the sinusoidal reference voltage is within a voltage range $E_p$ just above to just below the instantaneous value of the D-C error voltage $A_z$. As a result, the azimuth gate 36 is turned on for a short time interval on each side of the next expected corresponding pulse as determined by the past pulse history or D-C error voltage $A_z$ resulting from the last received pulse.

Briefly, the over all operation of the gating pulse generator 46 is such that the sinusoidal reference voltage $R \sin \theta$ and the D-C error voltage $A_z$ are applied to the circuit to generate square wave gating pulses $E_s$ at the output. Referring to the gating pulse generator schematically illustrated in FIG. 10, the A-C reference voltage and the D-C error voltage $A_z$ are applied to opposite transistors of an input stage differential amplifier 121 to generate two 180° out-of-phase sinusoidal voltage V1 and V2 which are each amplitude displaced in opposite directions from a center reference voltage by an amount equal to the D-C error voltage $A_z$ as graphically illustrated by the waveforms in FIGS. 11*a* and 11*b*. These sinusoidal signals are applied to a diode gate 122 which is D-C biased by an adjustable threshold voltage $E_p$ developed across a potentiometer 123 so that the output signal V4 of a high gain differential amplifier 126 is turned on when the instantaneous value of both out-of-phase differential voltages V1 and V2 are below the threshold voltage $E_p$, and such that the output signal V4 is turned off when either one of the out-of-phase differential output voltages V1 or V2 is above the threshold voltage $E_p$. As a result, the output V4 of the high gain differential amplifier 126 is a square wave pulse which is amplified by an output amplifier 127 to generate square wave negative polarity pulses $E_s$ as illustrated in FIG. 10.

Figure 10:
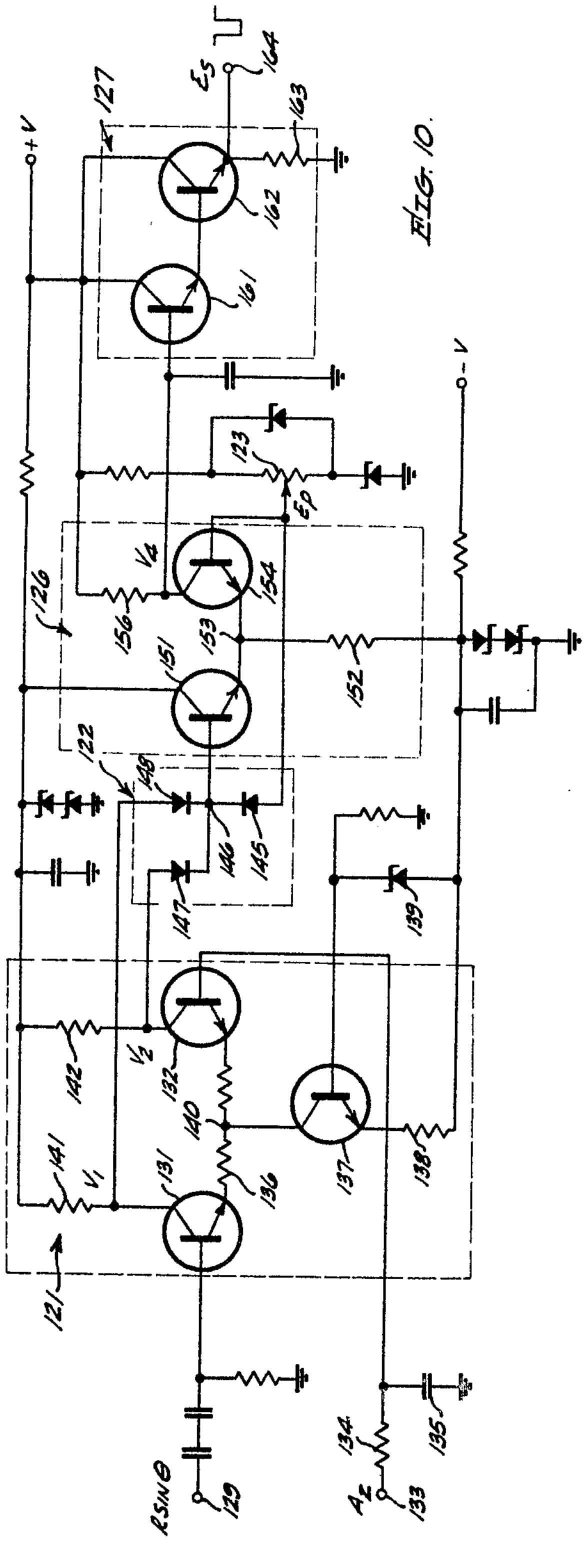
FIG. 10 is a schematic circuit diagram of one of the pulse generators diagrammatically illustrated in FIG. 4.

Now referring to the details of the gating pulse generator schematically illustrated in FIG. 10, the sinusoidal azimuth reference signal $R \sin \theta$ is applied to an input terminal 129 through the two coupling capacitors to the base terminal of an n-p-n transistor 131 in the input stage differential amplifier 121. The D-C error signal $A_z$ is applied to an input terminal 133 to the base of a second n-p-n transistor 132 in the differential amplifier 121 through an RC coupling circuit including a series resistor 134 and a shunting capacitor 135. As the instantaneous value of the sinusoidal azimuth reference signal $R \sin \theta$ becomes more positive the base terminal and emitter terminal of the n-p-n transistor 131 become more forward biased to increase the conduction of the transistor 131. The emitter current of transistor 131 flows through an emitter resistor 136 and branches into a common circuit branch including a normally conducting n-p-n transistor 137 and an emitter resistor 138. The base terminal of the normally on transistor 137 is forward biased relative to the emitter by a Zener diode 139 so that current will conduct through the normally on transistor 137 and the common emitter resistor 138 to raise the potential relative to ground at a common junction 140 of the two differential amplifying transistors 131 and 132. Thus, as the base terminal of the first input transistor 131 becomes more positive the collector current conduction through a collector resistor 141 increases to generate an A-C sinusoidal signal VI at the collector terminal of the transistor 131. As the emitter current conduction of the transistor 131 increases, the rise in potential at the common junction 140 decreases the forward base terminal-to-emitter terminal bias on the other transistor 132 to decrease the collector current conduction through a collector resistor 142 to develop an A-C signal V2 at the collector terminal of the transistor. This A-C signal V2 is 180° out of phase with the signal V1 developed simultaneously at the collector of the transistor 141. The two A-C signals V1 and V2 are each voltage displaced from each other by twice the value of the D-C error signal $A_z$ applied to the base terminal of the transistor 132. Referring first to FIG. 11*a*, for no D-C error signal the two A-C voltages V1 and V2 are not displaced and are symmetrical about a common reference voltage. Now referring to FIG. 11*b*, with a D-C error signal the two voltages V1 and V2 are each voltage displaced above and below common reference voltage respectively by the amount equal to the instantaneous value of the D-C error voltage $A_z$.

These two out-of-phase A-C voltages V1 and V2 are applied to the diode gate 122 which is D-C biased by a threshold voltage $E_p$ developed across the potentiometer 123. Because of a coupling diode 145 a common junction 146 of the diode gate can never become more negative than the threshold potential $E_p$. When either V1 or V2 are of a higher potential than threshold voltage $E_p$ a respective diode 147 or 148 is forward biased and the diode gate conducts to switch the high gain differential amplifier 126. When both V1 and V2 are of a lower potential relative to the threshold voltage $E_p$ the diodes 147 and 148 are both back biased and the gate 122 is unswitched to cut off the high gain differential amplifier 126.

Thus, in operation at any time that the threshold voltage $E_p$ has a higher potential than V1 and V2, the input to base terminal of n-p-n transistor 151 decreases to decrease the forward bias on the base terminal and emitter terminal of the transistor. As a result, emitter current conduction of the transistor 151 through a common emitter resistor 152 decreases to decrease the potential relative to ground at a common emitter junction terminal 153.

As the potential at the common emitter terminal 153 decreases, the forward bias on the base terminal and emitter terminal of an n-p-n transistor 154 increases to increase collector current conduction through a collector resistor 156. As a result of the high gain, the potential V4 developed at the collector terminal of the transistor 154 decreases sharply.

Referring back to the diode gate 122, at any time either one of the voltages V1 or V2 increases in potential above the reference threshold potential $E_p$ the signal to the base terminal of transistor 151 increases to increase the forward bias on base-emitter terminals of transistor 151. As a result, current conduction through the common emitter resistor 152 increases, whereupon the voltage or potential at the common emitter junction terminal 153 increases. As a result, the forward bias voltage developed across the base-emitter terminals of the other transistor 154 decreases quickly cutting off collector current conduction through the collector resistor 156, thereby causing a rise in the collector voltage V4. Since the differential amplifier 126 is a high gain amplifier the voltage signal V4 developed at the collector terminal of the transistor 154 is a substantially rectangular wave pulse having an inverted or relatively negative polarity and is thereafter fed to the two stage output amplifier 127.

The inverted output signal V4 from the high gain differential amplifier 126 is amplified by the two stage output amplifier 127 to generate a square wave pulse $E_s$ having a pulse duration equal to the time that the potential of both voltage V1 and V2 are lower than the potential of threshold voltage $E_p$. The base terminal of an amplifier stage transistor 161 is connected to receive the inverted output signal V4 from the high gain differential amplifier 126 to thereby amplify the signal. The amplified pulse signal developed at the emitter of the amplifier transistor 161 is applied to the base terminal of an emitter follower transistor 162 to decrease the forward base-emitter terminal bias thereby decreasing the emitter current conducted through an emitter resistor 163. As a result, a gating pulse $E_s$ is developed at a output terminal 164.

Referring first to the graphically illustrated voltage waveforms of FIG. 11*a*, with no D-C error signal $A_z$ the square wave output pulse $E_s$ occurs at 180° intervals. Now referring to FIG. 11*b*, with a D-C error signal the square wave output pulses $E_s$ occur at intervals of less than 180° or more than 180°, dependent upon the reference point or time used. In addition, when the D-C error signal is large, the width of the gating pulse $E_s$ is also large because of the decrease in the slope of the A-C voltages V1 and V2 in the vicinity of 90° and 270°. Thus, if the tracking system is used on a movable reference platform, such as an airplane, which changes its heading with reference to the source of radiation, the amount of such heading correction required is greatest when the source of radiation is far off center and smallest when the source of radiation is on center. Since this heading correction will have the same effect or movement of the source of radiation across the field of view, it is desirable to provide a long gating time when the relative movement of the source of radiation across the field of view is greatest. Because the gating pulse width varies, as previously mentioned, greater tracking capabilities and background discrimination are provided by this system than would be possible if the pulses were the same width for all target positions. In addition, the threshold voltage $E_p$ is adjustable by adapting potentiometer 123 so as to change the pulse width for different tracking conditions such as when radiation source movement across the field of view is expected to be either large or small.

The gate circuit 36 illustrated in block diagram form in FIG. 5 receives the logarithmically amplified pulse information from one of the logarithmic amplifier stages, preferably the third stage as illustrated in FIG. 7 or the fourth stage as illustrated in FIG. 5, to block conduction of the pulse information when the gating signal $E_s$ is at a quiescent relatively high voltage relative to pulse condition and to pass the logarithmically amplified pulses when the negative polarity gating pulse $E_s$ is received. As illustrated in FIG. 11, the gate circuit 36 includes three series connected emitter follower transistors 171, 172 and 173 connected between an input terminal 174 and an output terminal 175 with a normally saturated signal shunting transistor 176 connected in circuit to a junction between the first two emitter follower stages. The base terminal of the shunting transistor 176 is connected to a gating pulse input terminal 164 for control of the operating condition. More specifically, logarithmically amplified pulses are received at the input terminal 174 and are applied through a differentiating circuit including a series connected capacitor 177 and a shunting resistor 178 having one end connected to an adjusting potentiometer 179. The differentiated positive and negative pulse information is received at the base terminal of the first stage emitter follower transistor 171. These pulses increase and decrease the forward bias on the base to emitter terminals of the transistor 171, to cause an increase and decrease in the emitter current conduction, respectively. Thus, the voltage signal developed across an emitter resistor 181 is fed through a coupling resistor 180 connected between the emitter terminal of the first stage transistor 172 and the base terminal of the second stage emitter follower transistor 172. Between gating pulses $E_s$, the input applied to the gating signal input terminal 164 is high relative to the negative polarity pulses $E_s$ so that the base terminal and the emitter terminal of the shunting transistor 176 are forward biased to saturate the shunting transistor 176, thereby shunting all signals and holding the junction 183 at a substantially constant voltage level to block all pulse conduction to the following emitter follower stages. As a result, no output pulses are produced at the output terminal 175 between gating pulses $E_s$. When a negative polarity gating pulse $E_s$ is received at the input terminal 164, the voltage signal developed across a base bias resistor 182 is such to drive the base terminal of the shunting transistor 176 more negative than the emitter terminal, thereby reverse biasing the base emitter terminals to cut off the shunting transistor 176. As a result, the signals developed at the emitter terminal of the first stage emitter follower resistor 181 are transmitted to the base terminal of the second stage emitter transistor 172. As the unblocked pulses are fed to the second stage transistor 172, emitter current conduction decreases and increases to develop positive and negative pulse signals across an emitter follower diode 186 and a resistor 187. These pulses are then fed to the base terminal of the third stage emitter follower transistor 173. Thus, as this base terminal of the third stage transistor 173 becomes more positive and negative, its emitter current increases and decreases, respectively, to develop an increasing and decreasing voltage signal across an output stage emitter follower resistor 188 thereby producing unblocked pulse signals on the output terminal 175. When the negative polarity gating pulse $E_s$ ends, the base terminal of the shunting transistor 176 becomes more positive to again saturate the shunting transistor 176, thereby shunting any signals developed at the first stage emitter follower transistor 171. Thus, at any time that the negative polarity switching pulse $E_s$ is received, the gating circuit 36 will pass pulses. Between gating pulses $E_s$, however, all pulse signals received at input terminal 174 are blocked.

Obviously, many other modifications and variations of the present invention are possible in the light of the above teachings. It is therefore to be understood that within the scope of the invention can be practiced otherwise than as specifically described:

What is claimed is:

1. In a radiation detection system of the type including a nutating optical system which projects and focuses an image of detected radiation about a circular path, a radiation detector cell array adapted to be scanned by the nutated image in the circular path for generating an electrical pulse signal each time a cell is scanned, a signal generating means connected to the nutating optical system for generating an AC reference signal in synchronism with the nutation cycle, an improvement comprising: a pulse gate means connected to the cell array for selectively passing and blocking pulses received therefrom; a sampling gate connected to receive unblocked pulses from said pulse gate means and to receive the AC reference signal from the signal generating means for developing a DC output error signal having a value proportional to the instantaneous value of the AC reference signal at the time of receiving the unblocked pulse; and a gating pulse generator connected to receive the DC error signal from said sampling gate and to receive the AC reference signal from the signal generating means for comparing the values of the signals and for generating a gating pulse during the time duration that the instantaneous value of the AC reference signal is within a range extending a predetermined value above and below the value of the DC error signal, said pulse gate means being connected to receive the gating pulses from said gating pulse generator for passing the pulses from the cell array during the duration of each gating pulse and blocking the pulses during the time between gating pulses whereby the gating time is determined by the preceding passed pulse.

2. In a radiation detection system of the type including a nutating optical system which projects and focuses an image of detected radiation about a circular path, a radiation detector having a first radiation detector cell arm and a second radiation detector cell arm, the cell arms being arranged to cross one another and adapted to be scanned by the nutated image in the circular path for generating an electrical pulse signal each time a cell is scanned, a sinusoidal waveform signal generating means connected to the nutating optical system for generating two 90° out-of-phase A-C reference signals in synchronism with the nutation cycle, an improvement therein: a first and a second pulse processing channel means, said first channel means being connected to the first radiation detector cell arm to receive pulses generated thereat and the second said channel means being connected to the second radiation detector cell arm to receive pulses generated thereat, each said pulse processing channel means including: a pulse gate means connected for selectively passing and blocking pulse transimission therethrough, a sampling gate means connected to receive unblocked pulses from said pulse gate means and to receive one of the A-C reference signals from the sinusoidal waveform signal generating means for developing a D-C output error signal having a value proportional to the instantaneous value of the A-C reference signal at the time of receiving the unblocked pulse, and a gating pulse generator connected to receive the D-C error signal from said sampling gate and to receive the one A-C reference signal from the sinusoidal waveform signal generating means for comparing the values of the signals and generating a gating pulse during the time duration that the instantaneous values of the A-C reference signals are within a value range extending a predetermined value above and below the value of the D-C error signal for the preceding passed pulse signal, said pulse gate means being connected to receive the gating pulses from said gating pulse generator for passing the pulses through the channel during the duration of each gating pulse and blocking the pulses during the time between gating pulses.

3. In a radiation detection system of the type including a nutating optical system of the type that projects and focuses an image of detected radiation about a circular path, a radiation detector cell array adapted to be scanned by the projected nutated image in the circular path for generating an electrical pulse signal each time a cell is scanned, a sinusoidal signal generating means connected to the nutating system to generate an A-C reference signal in exact synchronism with the nutation cycle, an improvement comprising: an electrical circuit means connected to the cell array for receiving and providing a circuit path for the pulses; pulse gate means connected to said electrical circuit means for selectively opening and closing the electrical circuit path; a sampling switch circuit connected to the signal generator means for receiving the A-C reference signal and connected to said gate means for receiving passed pulses, said sampling switch circuit being rendered operable to conduct the A-C reference signal at the time of receiving the passed pulse signal whereby an output error signal is formed having a value proportional to the instantaneous value of the A-C reference signal at the time the passed pulse is received; and a gating pulse generator connected to receive the A-C reference signals from the signal generating means and to receive the output error signals from said sampling gate switch to compare the instantaneous value of the A-C reference signal with the value of the error signal for generating a gating pulse having a pulse duration equal to the amount of time that instantaneous value of the A-C reference signal is within a voltage range extending above and below the error voltage level for the last passed pulse signal, said pulse gate means being connected to receive the gating pulse from said gating pulse generator for closing the circuit path when a gating pulse is received and opening the circuit path when no gating pulse is received whereby only those pulses which occur during the pulse duration of the gating pulse will be passed by said pulse gate.

4. A background noise discriminator of the type which discriminates against unwanted signals comprising: a reference signal generator means for generating an A-C reference signal; a pulse processing gate means for receiving input pulses, said pulse processing gate means being connected to receive the A-C reference signal for generating a D-C signal having an amplitude directly proportional to the instantaneous value of the A-C reference signal at the time the input pulse is received; and a gating pulse generator connected to receive the D-C signal from said pulse processing gate means, said gating pulse generator being further connected to receive the A-C reference signal from said reference signal generator means for generating a gating pulse during the time duration that the instantaneous value of the A-C reference signal is within a range extending from a predetermined level above and below the value of the D-C signal for the last received pulse, said pulse processing gate means being connected to receive the gating pulses from said gating pulse generator for passing the input pulses only during the duration of each gating pulse and blocking the input pulses during the time interval between gating pulses.

5. A background noise discriminator of the type which discriminates between time modulated pulses and unwanted background noise signals comprising: a reference signal generator means for generating a sinusoidal reference signal; a pulse gate means for receiving input pulses and selectively passing or blocking the received pulses; a sampling gate connected to receive the passed pulses, said sampling gate being further connected to receive the sinusoidal reference signal for generating a D-C signal having a value directly proportional to the instantaneous value of the sinusoidal reference signal at the time of receiving the passed pulse; a gating pulse generator connected to receive the D-C signal from said sampling gate, said gating pulse generator being further connected to receive the sinusoidal reference signal from said reference signal generator means for generating a gating pulse output during the time duration that the instantaneous value of the sinusoidal reference signal is within a range extending from a predetermined level above and below the instantaneous value of the D-C signal for the last passed pulse, said pulse gate means being connected to receive the gating pulses from said gating pulse generator for passing the input pulses only during the duration of each gating pulse and blocking the input pulses during the time interval between gating pulses.

6. A background noise discriminator of the type which discriminates between time modulated input pulses and unwanted background signals comprising: a reference signal generator means for generating a sinusoidal reference signal; a pulse gate means for receiving the input pulses and selectively passing or blocking the received input pulses; a sampling gate connected to receive the passed pulses, said sampling gate being further connected to receive the sinusoidal reference signal for generating a D-C signal having an instantaneous value directly proportional to the instantaneous value of the sinusoidal reference signal at the time of receiving the passed pulse; and a gating pulse generator including a differential amplifier connected to receive the D-C signal from said sampling gate and further connected to receive the sinusoidal reference signal to generate a first and a second sinusoidal output signals which are 180° out of phase with one another and are respectively level displaced above and below a reference potential by an amount equal to the D-C error signal, and a voltage biased gate connected to receive the level displaced A-C signals for generating a gating pulse signal during the time that the values of the received signals are both below the bias signal potential, said pulse gate means being connected to receive the gating pulses from said gating pulse generator for passing the input pulses only during the duration of each gating pulse and blocking the input pulses during the time interval between gating pulses.

7. A background noise discriminator of the type which discriminates between time modulated input pulses and unwanted background signals comprising: a reference signal generator means for generating a sinusoidal reference signal; a pulse gate means for receiving the input pulses and selectively passing or blocking the received input pulses; a sampling gate connected to receive the passed pulses, said sampling gate being further connected to receive the sinusoidal reference signal and generating a D-C signal having a value directly proportional to the instantaneous value of the sinusoidal reference signal at the time of receiving the passed pulse; and a gating pulse generator including a differential amplifier connected to receive the D-C signal from said sampling gate and further connected to receive the sinusoidal reference signal to generate a first and a second sinusoidal output signal which are 180° out of phase with one another and are respectively level displaced above and below a reference potential by an amount equal to the D-C error signal, and a voltage biased gate having a first and a second diode connected between a voltage bias terminal to receive the first and the second level displaced sinusoidal signals for generating a gating pulse signal during the time that the potentials of the 180° out of phase signals are both below the bias signal potential, said pulse gate means being connected to receive the gating pulses from said gating pulse generator for passing the input pulses only during the duration of each gating pulse and blocking the input pulses during the time interval between gating pulses.

8. A background noise discriminator of the type which discriminates between time modulated input pulses and unwanted background signals comprising: a reference signal generator means for generating a sinusoidal reference signal; a pulse gate means for receiving the input pulses and selectively passing or blocking the received input pulses; a sampling gate connected to receive the passed pulses, said sampling gate being further connected to receive the sinusoidal reference signal and generating a D-C signal having an instantaneous value directly proportional to the instantaneous value of the sinusoidal reference signal at the time of receiving the last passed pulse; a gating pulse generator including a differential amplifier connected to receive the D-C signal from said sampling gate and further connected to receive the sinusoidal reference signal to generate a first and a second sinusoidal output signal which are 180° out of phase with one another and are respectively level displaced above and below a reference potential by an amount equal to the D-C error signal, a voltage bias potentiometer having a terminal, a voltage biased gate having a first and a second diode connected to the voltage bias terminal and to receive the first and the second amplitude displaced sinusoidal signals for generating a gating pulse signal during the time that the 180° out of phase signals are both below the bias signal potential, said pulse gate means being connected to receive the gating pulses from said gating pulse generator for passing the input pulses only during the duration of each gating pulse and blocking the input pulses during the time interval between gating pulses.

9. A background noise discriminator of the type which discriminates between time modulated input pulses and unwanted background noise signals comprising: a reference signal generator for generating a sinusoidal reference signal; a pulse gate means for receiving the input pulses, said pulse gate means including a selectively saturable shunting transistor connected for selectively clamping the gate at a constant signal level and blocking the passage of received input pulses; a sampling gate connected to receive the passed pulses from said pulse gate means, said sampling gate being further connected to receive the sinusoidal reference signal from said reference signal generator for generating a DC signal having a value directly proportional to the instantaneous value of the sinusoidol reference signal at the time of receiving the passed pulse; and a gating pulse generator including a differential amplifier connected to receive the DC signal from said clamping gate and further connected to receive the sinusoidal reference signal from said reference signal generator to generate a first and a second sinusoidal output signal which are 180° out of phase with one another and are respectively level displaced above and below a reference potential by an amount equal to the DC error signal, and a voltage bias gate having a first and a second diode connected to a voltage bias terminal and to receive the first and the second 180° out of phase amplitude displaced sinusoidal signals, respectively, for generating a gating pulse signal only during the time that the potential of the 180° out of phase signals are both below the bias potential, the said shunting transistor of said pulse gate means being connected to receive the gating pulse from said gating pulse generator for cutting off the shunting transistor and passing the input pulses only during the duration of each gating pulse and blocking the input pulses during the time interval between gating pulses.

10. In a radiation detection system of the type including a nutating optical system which projects and focuses an image of detected radiation about a circular path, a radiation detector cell array adapted to be scanned by the nutated image in the circular path for generating an electrical pulse signal each time a cell is scanned, a sinusoidal signal generating means connected to the nutating optical system for generating an AC signal in exact synchronism with the nutation cycle, a pulse discriminator comprising: a pulse gate means for receiving the input pulses, said pulse gate means including a selectively saturable shunting transistor connected to clamp the gate means at a constant signal level for blocking the passage of the received input pulses; a sampling circuit means connected to receive the passed pulses from said pulse gate means and to receive the AC reference signal from the sinusoidal signal generating means, said sampling circuit means including a diode switch bridge having a first pair of terminals connected to receive the passed pulse signal, and a second pair of terminals connected to receive the AC reference signal whereby the diode bridge is forward biased by the pulse signal to conduct the AC reference signal only at the time of receiving the passed pulse, and a capacitor storage means connected to receive the conducted AC signal to develop a voltage signal having an instantaneous value directly proportional to the instantaneous value of the AC reference signal at the time of diode bridge switching; and a gating pulse generator including a differential amplifier connected to receive the DC output signal from said sampling circuit means and further connected to receive the AC reference signal from the sinusoidal signal generating means for generating a first and a second synchronous sinusoidal output signal which are 180° out of phase with one another and are respectively level displaced above and below a reference potential by an amount equal to the DC error voltage, a voltage bias potentiometer having a voltage bias terminal, a voltage bias gate having a first and a second diode connected at one end to the voltage bias terminal and at the other ends to receive the first and the second level displaced synchronized sinusoidal signals for generating a gating pulse during the time that the said 180° out of phase signals are both below the bias signal potential, said pulse gate means being connected to receive the gating pulses from said gating pulse generator for passing the input pulses only during the duration of each gating pulse and blocking the gating pulses during the time interval between gating pulses.

References Cited

UNITED STATES PATENTS

| | | | |
|---|---|---|---|
| 3,341,653 | 9/1967 | Kruse | 178—6.8 |
| 2,413,023 | 12/1946 | Young | 329—107 X |
| 2,419,570 | 4/1947 | Labin et al. | 325—323 X |
| 2,117,231 | 1/1964 | Haynes | 250—203 |

OTHER REFERENCES

Huskey et al., Computer Handbook, McGraw-Hill, 1962, pp. 3–70 and pp. 5–107, relied upon.

RALPH G. NILSON, *Primary Examiner.*

T. N. GRIGSBY, *Assistant Examiner.*

U.S. Cl. X.R.

325—322, 323; 328—63; 329—107; 343—7.4